(12) United States Patent
Kim

(10) Patent No.: US 10,824,768 B2
(45) Date of Patent: Nov. 3, 2020

(54) SECURITY DEVICE FOR PREVENTING LEAKAGE OF DATA INFORMATION IN SOLID-STATE DRIVE

(71) Applicant: Dong Beom Kim, Seoul (KR)

(72) Inventor: Dong Beom Kim, Seoul (KR)

( * ) Notice: Subject to any disclaimer, the term of this patent is extended or adjusted under 35 U.S.C. 154(b) by 89 days.

(21) Appl. No.: 16/340,117

(22) PCT Filed: Oct. 2, 2017

(86) PCT No.: PCT/KR2017/011096
§ 371 (c)(1),
(2) Date: Apr. 7, 2019

(87) PCT Pub. No.: WO2018/070743
PCT Pub. Date: Apr. 19, 2018

(65) Prior Publication Data
US 2020/0012824 A1 Jan. 9, 2020

(30) Foreign Application Priority Data

Oct. 10, 2016 (KR) .................. 10-2016-0130931
Feb. 13, 2017 (KR) .................. 10-2017-0019717

(51) Int. Cl.
| | |
|---|---|
| H04N 7/16 | (2011.01) |
| G06F 7/04 | (2006.01) |
| G06F 21/79 | (2013.01) |
| G06F 21/62 | (2013.01) |
| G11C 16/22 | (2006.01) |

(52) U.S. Cl.
CPC .............. *G06F 21/79* (2013.01); *G06F 21/62* (2013.01); *G11C 16/22* (2013.01)

(58) Field of Classification Search
CPC .......... G06F 21/79; G06F 21/62; G11C 16/22
USPC ......................................................... 726/26
See application file for complete search history.

(56) References Cited

U.S. PATENT DOCUMENTS

| | | | |
|---|---|---|---|
| 2003/0058047 A1* | 3/2003 | Sakurai ............... | H03F 3/45197 330/253 |
| 2005/0006676 A1* | 1/2005 | Watanabe ......... | H01L 27/14609 257/290 |
| 2015/0169240 A1* | 6/2015 | Saito ..................... | G06F 3/0689 711/162 |
| 2015/0242335 A1* | 8/2015 | Kim .................... | G06F 12/1433 711/103 |

(Continued)

FOREIGN PATENT DOCUMENTS

| | | |
|---|---|---|
| JP | 2006209232 A | 8/2006 |
| JP | 2012194734 A | 10/2012 |
| JP | 2015212871 A | 11/2015 |

(Continued)

OTHER PUBLICATIONS

International Search Report of PCT/KR2017/011096.

*Primary Examiner* — Monjur Rahim
(74) *Attorney, Agent, or Firm* — Ryuh Patent Law; Steven Yu

(57) ABSTRACT

Disclosed is a security device for preventing leakage of data information in solid-state drive. The present invention provides the security device for preventing leakage of data information in solid-state drive (SSD), the device enabling a user to electrically destroy flash memory personally to prevent leakage of data stored in the SSD, which is used and is to be waste-processed.

3 Claims, 3 Drawing Sheets

(56) References Cited

U.S. PATENT DOCUMENTS

2017/0344295 A1* 11/2017 Sheffi ................. G11C 11/5635

FOREIGN PATENT DOCUMENTS

| KR | 20080063939 A | 7/2008 |
| KR | 20150039074 A | 4/2015 |

* cited by examiner

SECURITY DEVICE FOR PREVENTING LEAKAGE OF DATA INFORMATION IN SOLID-STATE DRIVE

TECHNICAL FIELD

The present invention relates to a security device for preventing leakage of data information in solid-state drive. More particularly, the present invention relates to a security device for preventing leakage of data information in solid-state drive (SSD), the device enabling a user to electrically destroy a flash memory personally to prevent leakage of data stored in the solid-state drive, which is used up and is to be waste-processed.

BACKGROUND ART

In order to protect information of an organization or an individual, for enterprises, public institutions, military corporations, financial companies, and groups or individuals using computers, when the computers are used up, administrative and technical activities such as, disposal, used for sale, donation, etc. are very important after completely erasing the data in the storing medium of the computer. This is because information is leaked frequently in the process of discarding or selling the computers previously used in schools, government offices, companies, financial institutions, military corporations, etc.

A solid-state drive (SSD) contains a flash memory (a NAND flash memory), such as a non-volatile memory, which maintains stored data without loss even after power is turned off. The flash memory has been used mainly in mobile devices, such as digital cameras, mobile phones, PDAs, etc. due to its low power consumption and no restriction of information input/output. However, recently, the flash memory is used to manufacture the SDD which is a mass storage device employing the same input-output interface as a hard disk drive of the computer. Because of the advantages, such as fast processing speed, noiseless, low heat, lower power consumption, etc., SSDs have rapidly replaced hard disks as a computer data permanent storage device. In this situation where the storing medium is changed from the hard disk to the SSD, there are no data information leakage prevention and storing medium destroying systems for the SSD yet. In contrast, there are concerns that information stored in the SSD may be leaked due to used-up SSD-mounted information devices for sale, etc. For disposal of the used-up SSD, using a degausser, a crusher, or a puncher conventionally used to discard hard disks may be considered. However, the degausser is a hard disk dedicated device that uses a strong magnetic field to destroy only recoded data rather than destroy the original form of the disk, and thus it is no applicable to the SSD. The crusher is currently used as a hard disk dedicated device that destroys the original form of the disk, and may be used for crushing the SSD. However, it takes at least 10 seconds to process each one, and thus the crusher is inefficient to process a large number of SSDs. Also, it is necessary to sort and separate destroyed variously-mixed scraps, which may lead to environment problems. Also, rental or purchase of separate equipment is required, and in the absence of the equipment, destruction of 100% is uncertain due to outsourcing processing, which may result in exposure to the risk of information leakage. The puncher is a hard disk dedicated device that drills a hole in the hard disk to destroy the original form of the disk, and thus it is inappropriate for punching the flash memory packaged in the SSD. Moreover, it is inefficient for enterprises, public institutions, military corporations, financial companies, groups, etc. to rent or purchase and directly operate these SSD data permanent erasing devices because it is expensive and takes much working time. In outsourcing processing in external companies, processing status is confirmed by confirmations of disposal, reports, etc., but it is difficult to ensure destruction of 100%. Also, actually, it is difficult for computer users to check afterhand whether the data storage region is processed to be unrecoverable. Thus, there is always the risk of information leakage in outsourcing processing.

DISCLOSURE

Technical Problem

The present invention has been made to prevent data information from being leaked by erasing data remaining in a flash memory of an SSD after a termination of use of the SSD as described above. A primary object of the present invention is to provide a security device for preventing leakage of data information in solid-state drive, the device enabling a user and an administrator to select and execute unrecoverable destruction of the data storage region of the SSD flash memory personally via a unit installed in the SSD.

Technical Solution

In order to accomplish the above object, the present invention provides a security device for preventing leakage of data information in solid-state drive including: a flash memory for storing data; an data interface for data communication with a host; a device controller controlling data exchange operation between the flash memory and the host via the data interface; and a buffer memory temporarily storing data read out from the flash memory by the device controller and data to be recorded in the flash memory, wherein the solid-state drive is provided with a high-voltage pulse generator generating and outputting a control gate breakdown voltage (a high-voltage pulse ranging DC 60 V to 240 V) capable of destroying a dielectric layer of a control gate of a flash memory cell when a user operates a switch separately from the device controller; a memory controller of the flash memory provides a voltage selector capable of selecting and inputting the high-voltage pulse from the high-voltage pulse generator to a word line of a flash memory cell array; and when the user turns on the switch, the memory controller executes addressing on all word lines and bit lines in sequence and applies the control gate breakdown voltage to the word line of the flash memory cell array.

The high-voltage pulse generator may include: a DC-DC converter electrically connected to an output side of a power supply of a computer to increase a voltage by receiving a DC power from the power supply; a resistor electrically connected to an output side of the DC-DC converter to adjust an output current from the DC-DC converter; a relay connected to the resistor in series to control an output current from the resistor; a diode connected to the relay in series to allowing a current that has passed through the relay to flow only in one direction; a condenser connected to the diode in series to be charged by a current flowing through the diode with a voltage capable of destroying the flash memory cell of the flash memory; a thyristor connected to the condenser in parallel to control a current charged in the condenser to flow in one direction to the wire; and a pulse voltage controller controlling the condenser to be charged by turning the relay on for a period of time when the user turns on the switch, the pulse voltage controller operating the thyristor with the condenser charged to apply a high voltage charged in the condenser to the wire.

It may be desirable that the relay is a solid-state relay (SSR).

A wire may be provided with an electrical conduction indicator indicating when the high-voltage pulse generator generates and outputs the high-voltage pulse to the wire.

Advantageous Effects

According to the present invention, with the SSD installed in the computer, the computer user or administrator may destroy the memory cell of the SDD in an unrecoverable manner personally through direct selection and an application of applying a high-voltage. Therefore, outsourcing processing to external companies is unnecessary, and it is unnecessary to rent or purchase separate equipment. Thus, it is possible to save expense and time for processing disposal of the SSD-stored data, and to fundamentally prevent information leakage in consequence of carrying out the SSD.

MODE FOR INVENTION

Figure 1:
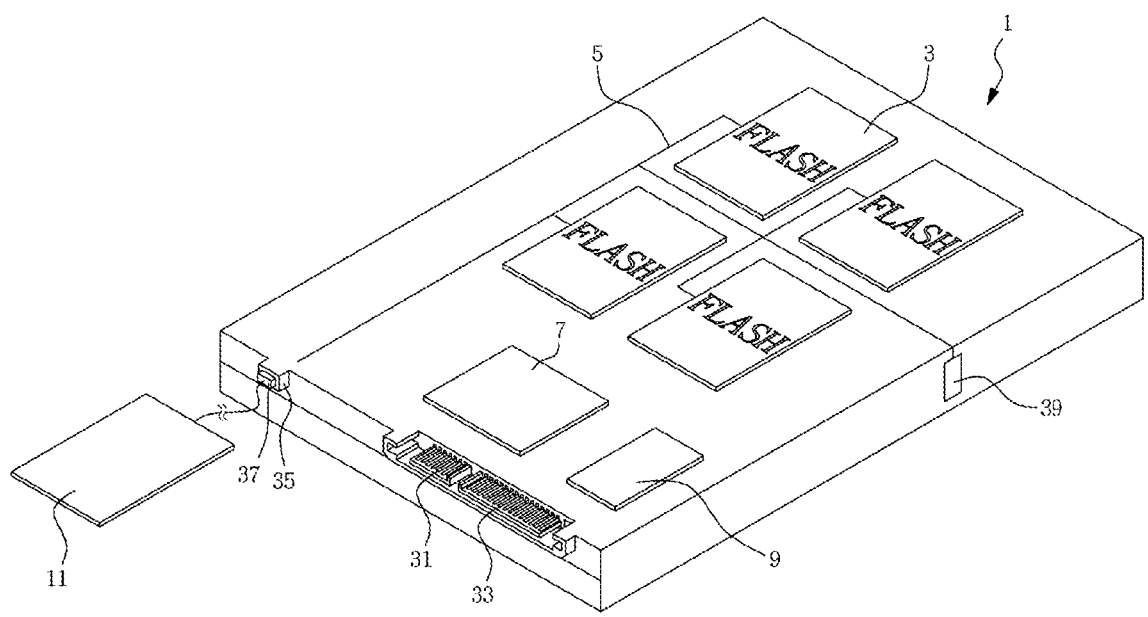
FIG. 1 is a configuration diagram illustrating a security device for preventing leakage of data information in solid-state drive according to an embodiment of the present invention.

Hereinafter, a detailed embodiment of an SSD data information leakage prevention security device according to the present invention will be described with reference to the accompanying drawings.

A memory cell of a general flash memory stores and erases information in a single transistor. The memory cell in a double poly-silicon structure is formed in the order of a semiconductor substrate, a tunneling oxide layer, a floating gate, a dielectric layer, a control gate, source and drain regions, a spacer, etc. The flash memory has two gates which are a floating gate and a control gate. The floating gate and the control gate are separated by the dielectric layer, and the floating gate and a silicon substrate are separated by the tunneling oxide layer. Data storage of the flash memory is realized by inserting or erasing electrons or holes into or from the floating gate generally. That is, the floating gate is completely isolated by the tunneling oxide layer and the dielectric layer, such as NO (Nitride-Oxide) or ONO (Oxide-Nitride-Oxide) dielectric layer. Therefore, once electrons or holes enter the floating gate, they do not leave the floating gate even if power is not applied such that data is not lost. In the meantime, in order to record or erase data, the voltage applied to an externally accessible end, namely, the control gate is required to be induced to the floating gate to generate a high electric field at opposite ends of the tunneling oxide layer. The ratio of the voltage applied to the control gate to being induced to the floating gate is called a coupling ratio (CR). When the coupling ratio is large, programming and erasing performance on the memory cell are highly efficiency and the voltage to be applied externally may be low. That is, the control gate is an electrode that serves as an actual gate of the non-volatile memory in a polysilicon stack structure. According to the bias state of the electrode, program recording and erasing of an element are performed. However, the dielectric layer between the control gate and the floating gate is formed to be extremely thin for high integration. Thus, when a breakdown voltage destroying the dielectric layer is applied to the control gate, the dielectric layer is damaged and the flash memory cell may fail to perform its function. In the flash memory, programming and erasing are performed at a relatively high bias (20 V). However, the thickness of the dielectric layer is extremely thin. Thus, when applying a voltage (equal to or greater than 60 V, it is also called a control gate breakdown voltage in the present invention) three times more than a normal driving voltage, the dielectric layer is destroyed and the flash memory cell no longer functions. In the meantime, the control gate of the flash memory cell is used in common with a word line. Through repeated tests, the applicant has confirmed that when the breakdown voltage ranging 60 to 240 V is applied to the control gate or the word line, the dielectric layer of the gate is destroyed and the word line is short-circuited. The present invention relates to a security device that may intentionally destroy the memory cell of the flash memory by bypassing an overvoltage cut-off circuit.

The embodiment illustrated in FIG. 1 is a data information leakage prevention security device where a high-voltage pulse generator 11 is detachably connected to a solid-state drive only when needed. The high-voltage pulse generator 11 may be provided integrally with the solid-state drive.

As described in FIG. 1, a solid-state drive 1 includes: a flash memory 3 for storing data; an data interface 31 for data communication with a host; a device controller 7 controlling data exchange operation between the flash memory 3 and the host via the data interface 31; and a buffer memory 9 temporarily storing data read out from the flash memory 3 by the device controller 7 and data to be recorded in the flash memory 3. The device controller 7 is electrically connected to the data interface 31 and the flash memory 3, and controls data transmission/reception with an external host (a central processing unit of a computer) and reading/recording of data in the flash memory 3. The data interface 31 of the SSD generally is Serial AT Attachment (SATA) which is compatible with a hard disk interface.

Figure 3:
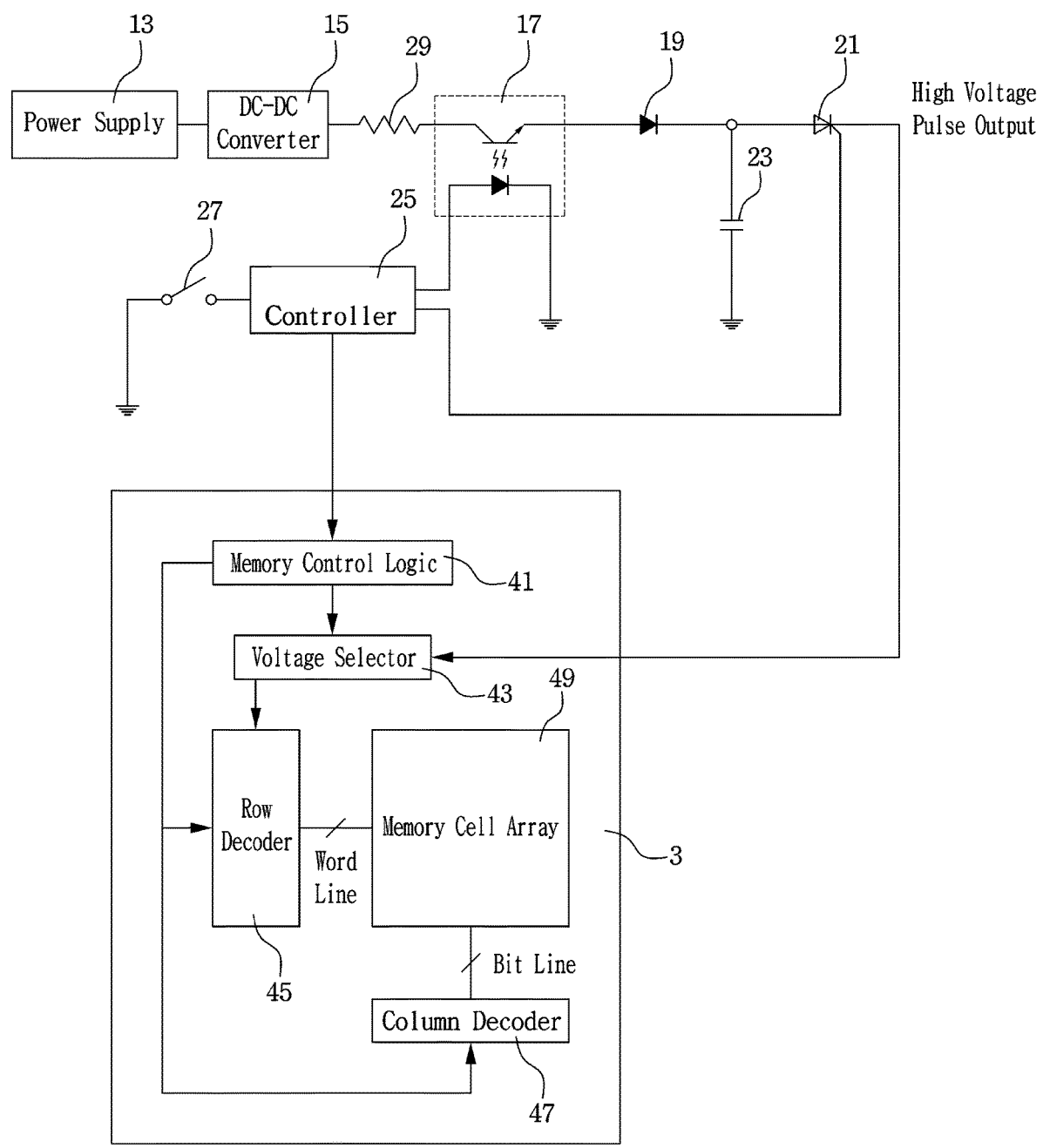
FIG. 3 is a schematic diagram illustrating a method of applying the high-voltage pulse generator illustrated in FIG. 2 to a flash memory.

As described in FIG. 3, the flash memory 3 includes: a flash memory cell array 49; a memory controller. The memory controller consists of a low decoder (X address decoder) 45 for a word line address, a column decoder (Y address decoder) 47 for a bit line address, a memory control logic 41 generating various control signals, etc. The low decoder 45 receives a word line address and a word line disable signal from the memory control logic 41 to select a word line. The column decoder 47 receives a bit line address and a bit line disable signal from the memory control logic 41 to select a bit line.

Figure 2:
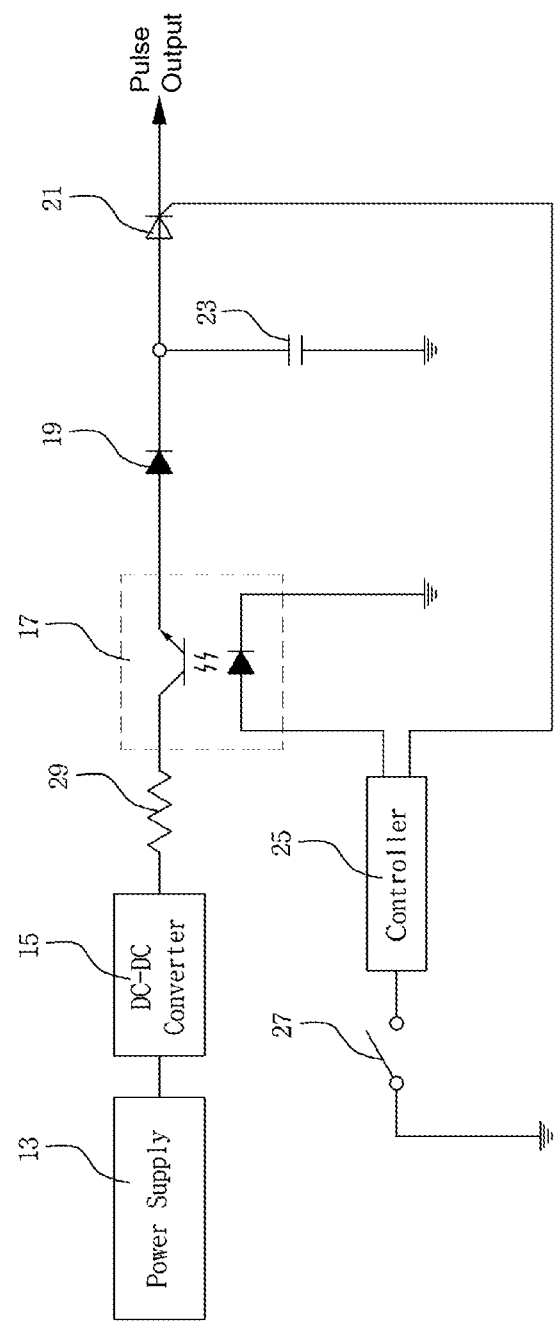
FIG. 2 is a circuit diagram illustrating an example of a high-voltage pulse generator according to the present invention.

As described in FIGS. 1 and 2, according to the present invention, the solid-state drive is provided with the high-voltage pulse generator 11 generating and outputting the control gate breakdown voltage (a high-voltage pulse ranging DC 60 V to 240 V) capable of destroying the dielectric layer of the control gate of the flash memory cell when the user operates a switch 27 separately from the device controller 7. The memory controller of the flash memory 3 provides a voltage selector 43 selecting and inputting a high-voltage pulse from the high-voltage pulse generator 11 to the word line of the flash memory cell array 49.

As described in FIG. 3, when the user turns on the switch 27, the memory control logic 41 controls the voltage selector 43 to apply the high-voltage pulse output from the high-voltage pulse generator 11 to the word line, and controls the low decoder 45 and the column decoder 47 to perform addressing on all word lines and bit lines of the memory cell array 49 in sequence and to apply the control gate breakdown voltage to all word lines of the flash memory cell array 49.

As described in FIG. 1, to this end, the present invention provides a wire 5 capable of applying a high-voltage pulse to a cell transistor word line of the flash memory 3 by bypassing the device controller 7. The wire 5 is connected to the high-voltage pulse generator 11 generating a high-voltage pulse that breaks down the dielectric layer of the control gate of the memory cell in the flash memory 3 by switching of the user so as to output the high-voltage pulse to the wire.

The high-voltage pulse that breaks down the control gate of the memory cell of the flash memory 3 is a voltage ranging DC 60 V to 240 V. That is, the memory cell of the flash memory 3 consists of a single transistor, and a word line bias rated voltage of each transistor is less than 60 V (generally, 15 V to 20 V). Therefore, when the high-voltage pulse ranging DC 60 V to 240 V is applied to the word line as a bias voltage, the memory cell breaks down at the dielectric layer of the control gate and is permanently unrecoverable. This is different from normal erasing or batch erasing of data stored in the memory cell of the flash memory by controlling the control gate bias voltage.

As described in FIG. 1, the wire 5 is provided with an electrical conduction indicator 39, such as an LED, etc. indicating when the high-voltage pulse generator 11 generates and outputs the high-voltage pulse to the wire.

As described in FIG. 1, only the wire 5 is formed in the SSD 1 in advance. The high-voltage pulse generator is separately manufactured, and may be detachably attached to the SSD 1 via a connector 37 to be connected to the high-voltage pulse generator 11 and a socket 35 connected to the wire 5. The high-voltage pulse generator 11 and the wire 5 may be integrally manufactured into the SSD 1. In FIG. 1, an SATA power end is designated by the reference numeral 33.

As described in FIG. 3, the high-voltage pulse generator 11 includes: a DC-DC converter 15 electrically connected to an output side of a power supply 13 of the computer (or a host) to increase the voltage by receiving a DC power from the power supply 13; a resistor 29 electrically connected to an output side of the DC-DC converter 15 to adjust an output current from the DC-DC converter 15; a relay 17 connected to the resistor 29 in series to control an output current from the resistor 29; a diode 19 connected to the relay 17 in series to allowing the current that has passed through the relay 17 to flow only in one direction; a condenser 23 connected to the diode 19 in series to be charged by the current flowing through the diode 19 with a voltage capable of destroying the memory cell of the flash memory 3; a thyristor 21 connected to the condenser in parallel to control the current charged in the condenser 23 to flow in one direction to the wire 5; and a pulse voltage controller 25 controlling the condenser 23 to be charged by turning the relay 17 on for a period of time when the user turns on the switch 27, the pulse voltage controller operating the thyristor 21 with the condenser 23 charged to apply the high voltage charged in the condenser 23 to the wire 5. It is desirable that the relay 17 is a solid-state relay (SSR).

As described in FIG. 3, according to the present invention with the above-described configuration, with the SSD installed in the computer, the computer user or administrator operates the high-voltage pulse generator 11 via the switch 27 to apply the high-voltage pulse to the memory cell of the SSD, whereby the memory cell of the flash memory may be personally destroyed in an unrecoverable manner. Therefore, outsourcing processing to external companies is unnecessary, and it is unnecessary to rent or purchase separate equipment. Thus, it is possible to save expense and time for processing disposal of the SSD-stored data, and to fundamentally prevent information leakage in consequence of carrying out the SSD.

The invention claimed is:

1. A security device for preventing leakage of data information in solid-state drive including: a flash memory for storing data; an data interface for data communication with a host; a device controller controlling data exchange operation between the flash memory and the host via the data interface; and a buffer memory temporarily storing data read out from the flash memory by the device controller and data to be recorded in the flash memory, wherein the solid-state drive is provided with a high voltage pulse generator generating and outputting a control gate breakdown voltage capable of destroying a dielectric layer of a control gate of a flash memory cell when a user operates a switch separately from the device controller, wherein the control gate breakdown voltage is a high-voltage pulse ranging DC 60 V to 240 V;

a memory controller of the flash memory provides a voltage selector capable of selecting and inputting the high-voltage pulse from the high-voltage pulse generator to a word line of a flash memory cell array; and when the user turns on the switch, the memory controller executes addressing on all word lines and bit lines in sequence and applies the control gate breakdown voltage to the word line of the flash memory cell array.

2. The data information leakage prevention security device of claim 1, wherein the high-voltage pulse generator includes:

a DC-DC converter electrically connected to an output side of a power supply of a computer to increase a voltage by receiving a DC power from the power supply;

a resistor electrically connected to an output side of the DC-DC converter to adjust an output current from the DCDC converter;

a relay connected to the resistor in series to control an output current from the resistor;

a diode connected to the relay in series to allowing a current that has passed through the relay to flow only in one direction;

a condenser connected to the diode in series to be charged by a current flowing through the diode with a voltage capable of destroying the flash memory cell of the flash memory;

a thyristor connected to the condenser in parallel to control a current charged in the condenser to flow in one direction to the wire; and a pulse voltage controller controlling the condenser to be charged by turning the relay on for a period of time when the user turns on the switch, the pulse voltage controller operating the thyristor with the condenser charged to apply a high voltage charged in the condenser to the wire.

3. The data information leakage prevention security device of claim 1, wherein a wire is provided with an electrical conduction indicator indicating when the high-voltage pulse generator generates and outputs the high-voltage pulse to the wire.

* * * * *